US008179779B2

(12) United States Patent
Ashikhmin et al.

(10) Patent No.: US 8,179,779 B2
(45) Date of Patent: May 15, 2012

(54) PILOT SIGNAL ALLOCATION METHOD AND APPARATUS FOR MULTI-USER WIRELESS SYSTEMS

(75) Inventors: Alexei Ashikhmin, Morristown, NJ (US); Thomas Louis Marzetta, Summit, NJ (US)

(73) Assignee: Alcatel Lucent, Paris (FR)

( * ) Notice: Subject to any disclaimer, the term of this patent is extended or adjusted under 35 U.S.C. 154(b) by 407 days.

(21) Appl. No.: 12/586,823

(22) Filed: Sep. 29, 2009

(65) Prior Publication Data
US 2011/0075617 A1  Mar. 31, 2011

(51) Int. Cl.
*H04J 11/00* (2006.01)
(52) U.S. Cl. ......... 370/207; 370/329; 370/480; 455/423
(58) Field of Classification Search ............. 370/207, 370/329, 408; 455/1, 423
See application file for complete search history.

(56) References Cited

U.S. PATENT DOCUMENTS

| 2007/0086406 | A1 | 4/2007 | Papasakellariou | |
|---|---|---|---|---|
| 2008/0013480 | A1* | 1/2008 | Kapoor et al. | 370/328 |
| 2010/0099423 | A1* | 4/2010 | Ogawa et al. | 455/450 |

FOREIGN PATENT DOCUMENTS
WO  PCT/US2010/049216  3/2011

OTHER PUBLICATIONS

Simko 'Inter-Carrier Interference Estimation in MIMO OFDM Systems with Arbitrary Pilot Structure' Vehicular Technology Conference (Vtc Spring), 2011 IEEE 73rd May 15, 2011.*
Vishwanath S et al: "Pilot contamination problem in multi-cell TDD systems", Information Theory, 2009. ISIT 2009. IEEE International Symposium on, IEEE, Piscataway, NJ, USA, Jun. 28, 2009, pp. 2184-2188, XP031513536, ISBN: 978-1-4244-4312-3 the whole document.

* cited by examiner

*Primary Examiner* — Seema S Rao
*Assistant Examiner* — Henry Baron
(74) *Attorney, Agent, or Firm* — M.I. Finston

(57) ABSTRACT

A construction is provided for uplink pilot signals in a cellular network. Three sets of pilot signals are defined, having orthogonality properties that lead to reduced inter-cell interference. In example embodiments, the network has a reuse factor of 3 for pilot signals, with sets U, V, and W of pilot signals assigned to cells in respective reuse classes. The pilots of each set form an orthogonal basis. Some pilots of each class, i.e. those which will generally be assigned to mobile stations near the cell edges, will also form an orthogonal basis with some pilots of each of the other classes.

14 Claims, 5 Drawing Sheets

PILOT SIGNAL ALLOCATION METHOD AND APPARATUS FOR MULTI-USER WIRELESS SYSTEMS

FIELD OF THE INVENTION

The invention relates generally to wireless communication networks in which user terminals transmit pilot signals to a base station for the purpose of measuring propagation characteristics. The invention relates more particularly to mobile wireless systems employing Time-Division Duplexing (TDD).

ART BACKGROUND

In a typical mobile wireless multi-user system, a plurality of radio cells cover an extensive geographical area. A base station (BS) is centrally located within each cell. The BS receives and transmits data to those mobile user terminals, referred to hereinafter as "mobiles" or "mobile stations", that are located in the same cell as the BS.

However, signals transmitted by a given base station will propagate not only to the mobiles within its own cell, but also to mobiles in the neighboring cells. As a consequence, downlink transmissions from each base station will tend to create noise, referred to as "intercell interference," at the mobiles of neighboring cells. Similarly, signals transmitted by each mobile within a given cell will propagate not only to the base station serving that cell, but also to the base stations serving neighboring cells. As a consequence, uplink transmissions from each mobile will tend to create intercell interference at the base stations serving neighboring cells.

For example, FIG. 1 illustrates a portion of a cellular network in which downlink transmissions from the base station of cell 1 interfere with mobile stations in cell 2.

Intercell interference, as described above, is a major obstacle to increasing the rate of data transmission in modern wireless systems. In particular, intercell interference degrades the gains in transmission rate that can otherwise be made by employing multiple antennas at the base station. That is, the theoretical maximum feasible transmission rate on the downlink increases linearly with the number of base station antennas. However, the amount of intercell interference increases with the number of base station antennas in such a way that only a sublinear increase is achieved.

SUMMARY OF THE INVENTION

We have found an efficient way to reduce inter-cell interference in mobile wireless systems, and particularly in Time Division Duplexing (TDD) wireless systems.

In an embodiment, a base station receives uplink pilot signals from one or more mobile stations and receiver at the base station derives information about the propagation channel from the pilot signals. This is done using orthogonality properties of one of three sets $U=\{u_i\}$, $V=\{v_i\}$, $W=\{w_i\}$ of pilot signals.

The elements $u_i$, $v_i$, or $w_i$, respectively, of each set of pilot signals are mutually orthogonal vectors. Each of the sets U, V, W contains the greatest possible number of elements that can be mutually orthogonal; that is, U, V, and W are largest sets of mutually orthogonal vectors, and as such, each of U, V, and W is an orthogonal basis.

At least three of the $u_i$ form an orthogonal basis with at least six of the $v_i$, at least three other of the $u_i$ form an orthogonal basis with at least six of the $w_i$, and said at least six of the $u_i$ form an orthogonal basis with at least three of the $v_i$ and form another orthogonal basis with at least three of the $w_i$.

In an embodiment, the cellular network has a reuse factor of 3 for uplink pilot signals to be used for channel measurement, said base station belonging to a reuse class A that is one of three reuse classes A, B, and C. Each mobile station currently within a cell served by the base station is classified as a center mobile, a peripheral mobile near a class B cell, or a peripheral mobile near a class C cell. Pilot signals are allocated to the mobiles within the served cell according to how they are classified.

In an embodiment, a mobile receives a signal from a base station designating a pilot signal to be selected for transmission, and selects and transmits the designated pilot signal. The selection of a designated pilot signal is made from one of three sets U, V, W of signal vectors having the properties described above.

BRIEF DESCRIPTION OF THE DRAWING

FIG. 3 illustrates an allocation of pilot signals to peripheral mobile stations according to the principles described below.

DETAILED DESCRIPTION

Channel Coefficients

Figure 1:
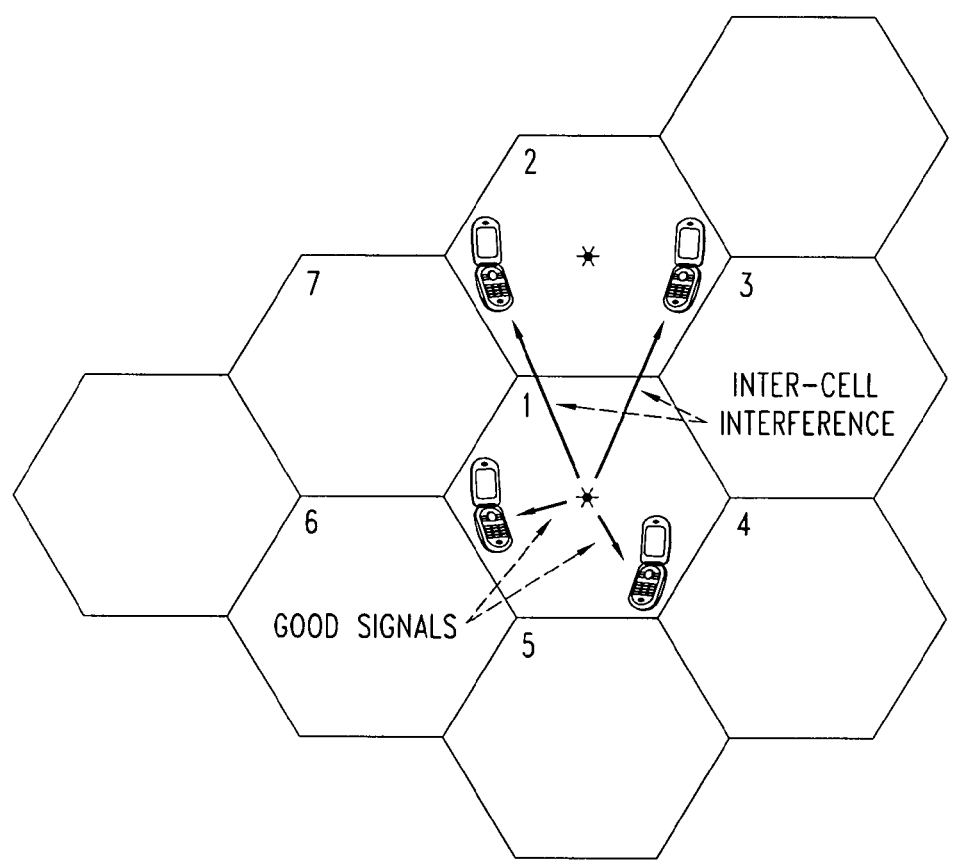
FIG. 1 is a schematic drawing of a portion of a typical cellular network having hexagonal geometry, illustrating inter-cell interference between the cells numbered 1 and 2 in the figure.

For purposes of illustration, we will base our description on a network in which OFDM data transmission is used. The invention is not limited in application to OFDM networks, however, but instead is applicable to any type of network in which uplink pilot signals are used for the purpose of measuring characteristics of the propagation channel.

For simplicity of presentation, we will limit the following discussion to one of the plurality of orthogonal subchannels used in OFDM systems for data transmission. Extension of the below discussion to the full set of OFDM subchannels is straightforward.

In the below discussion, signals and coefficients will be indexed using the following symbols:

j identifies a particular cell in which a mobile is present;

l identifies a particular base station and by extension, the cell served by that particular base station;

k identifies a particular mobile within a given cell; and m identifies a particular antenna at a given base station.

We will assume that there are L cells in a group consisting of a given cell and its neighboring cells, with K mobiles in each cell. We will assume that all base stations have M antennas for transmission and reception and that each mobile has one antenna. We denote signals transmitted by the k-th mobile of the j-th cell by $x_{jk}$. Signals received by the m-th antenna of the l-th base station we denote by $y_{lm}$. By $p_{MS}$ and $p_{BS}$ we denote transmitted power levels of mobiles and base stations respectively. For illustrative purposes, we will make the simplifying assumption that all mobiles have the same power and that all base stations have the same power.

During transmission, the effect of the propagation channel is to multiply each signal from the k-th mobile of the j-th cell to the m-th antenna of the l-th base station by the complex-valued channel coefficient $h_{jlkm}$. The respective channel coefficients from the k-th mobile of the j-th cell to the M antennas of the l-th cell form the channel vector $$h_{jlk} = (h_{jlk1}, \ldots, h_{jlkM}).$$

(Herein, the bold font is used to denote vectors.) The channel coefficients $h_{jlkm}$ are modeled as random variables. The channel coefficients $h_{jlkm}$ remain approximately constant during the coherence interval T. The length of the coherence interval T depends on the speed of a mobile. The faster a mobile is moving, the shorter the coherence interval for its channel coefficients $h_{jlk} = (h_{jlk1}, \ldots, h_{jlkM})$. For mobiles moving with a speed of 50 or 70 km/h the coherence interval T is approximately equal to the time needed for transmission of 20 or 10 OFDM symbols, respectively.

Because in our example the same frequency subchannel is used on both the downlink and the uplink, reciprocity applies and a signal transmitted from the m-th antenna of the l-th base station base station to the mobile is likewise multiplied by the same channel coefficient $h_{jlkm}$.

Shadowing Coefficients.

Practical experience has shown that in modeling a wireless network, it is useful to include a relatively slowly varying, generally real-valued coefficient to represent attenuation of transmitted signals due to distance or other factors such as intervening topographical features, buildings, or other physical obstructions. That is, a signal transmitted from the k-th mobile of the j-th cell to any antenna of the l-th base station is multiplied by the shadowing coefficient $\beta_{jlk}$. The shadowing coefficients $\beta_{jlk}$ take random values. Unlike the channel coefficients, the shadowing coefficients stay constant much longer. For this reason a base station can, at least in principle, accurately estimate the shadowing coefficients to all the mobiles of the neighboring cells.

Accordingly, we will assume in the following discussion that the shadowing coefficients $\beta_{jlk}$, j=1, ..., L, k=1, ..., K, are known to the l-th base station. It is also important to note that the shadow coefficient $\beta_{jlk}$ will, in general, be strongly correlated with the distance between the L-th base station and the k-th mobile of the j-th cell. The larger the distance, the smaller (typically) will be the value of $\beta_{jlk}$.

Figure 4:
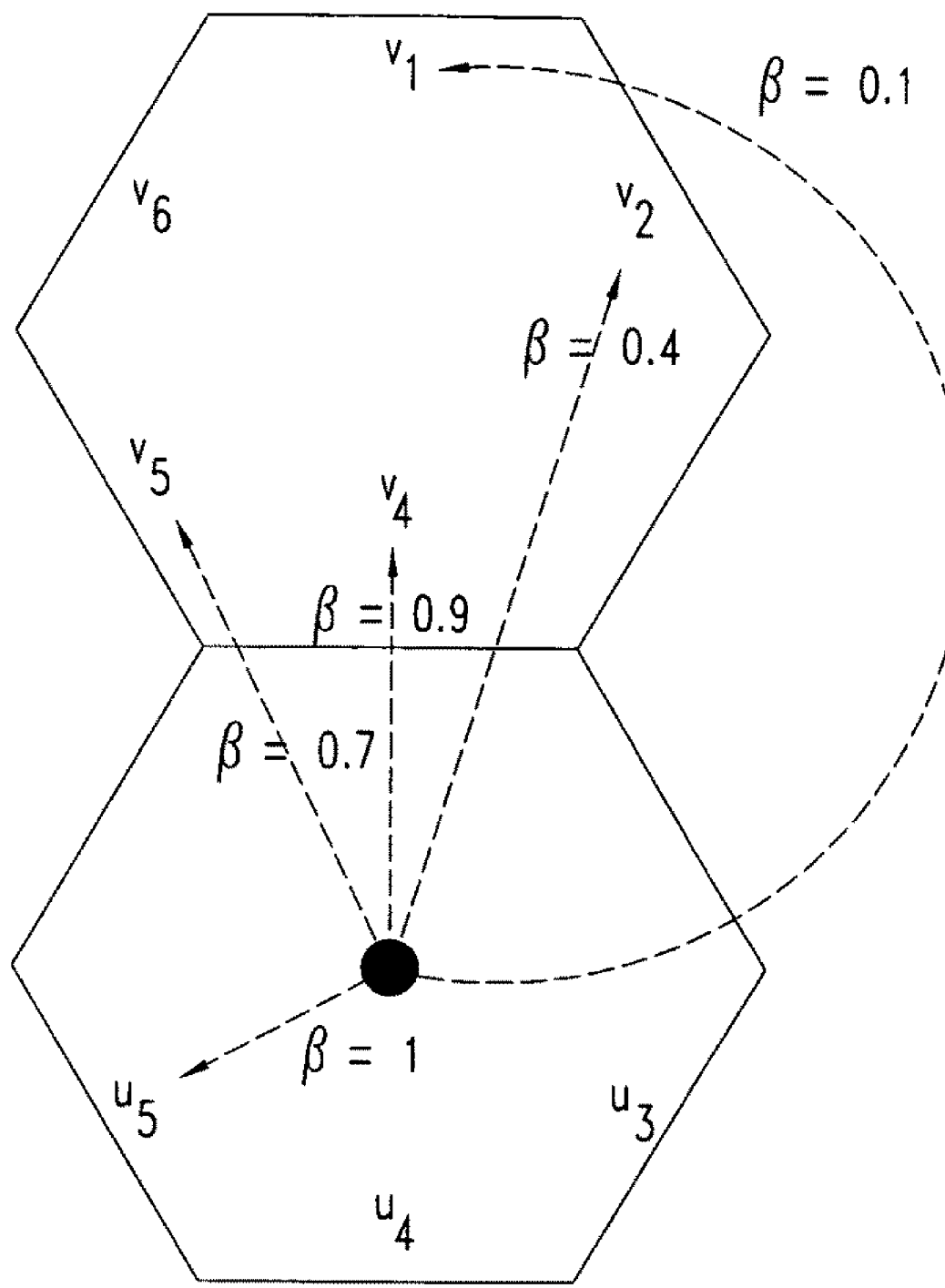
FIG. 4 is a detail of the cellular network of FIG. 3, illustrating a typical relationship between geometry and shadowing coefficients.

A typical example of values of shadowing coefficients for two neighboring cells is shown in FIG. 4, where it will be seen that β varies from a high value of 1.0 for the mobile assigned pilot signal $u_5$, relative to its own serving base station, which is very near, to a low value of 0.1 for the mobile assigned pilot signal $v_1$ relative to its neighbor base station, which is very distant.

Estimation of the Channel Coefficients.

Knowledge of the channel coefficients allows a base station to reduce the intra-cell interference and the inter-cell interference by using interference cancellation precoding.

To allow the base stations to estimate the channel coefficients $h_{jklm}$, all mobiles, in all cells, synchronously (in the present example) transmit training pilot signals $\psi_{jk}$, j=1, ..., L, k=1, ..., K, of τ symbols each. Thus, each pilot signal is a τ-tuple of scalar-valued symbols, and as such is a τ-dimensional vector. As a consequence of a pilot signal $\psi_{jk}$ having been transmitted, a τ-dimensional vector $y_{lm}$ is received at the m-th antenna of the l-th cell, having the form $$y_{lm} = \sum_{j=1}^{L} \sum_{k=1}^{K} \sqrt{p_{MS}\tau\beta_{jlk}}\, h_{jlkm} \Psi_{jk} + w_{lm} \quad (1)$$

where the τ-tuple $w_{lm}$ represents additive noise.

We now introduce the following definitions, expressed in terms of quantities defined above:

$$Y_l = [y_{l1}, \ldots, y_{lM}],$$

$$W_l = [w_{l1}, \ldots, w_{lM}],$$

$$\Psi_j = [\Psi_{j1}, \ldots, \Psi_{jK}],$$

$$D_{jl} = diag\{\beta_{jl1}, \ldots, B_{jlK}\},$$

$$H_{jl} = \begin{bmatrix} h_{jl11} & \cdots & h_{jl1M} \\ \vdots & \ddots & \vdots \\ h_{jlK1} & \cdots & h_{jlKM} \end{bmatrix} = \begin{bmatrix} h_{jl1} \\ \vdots \\ h_{jlK} \end{bmatrix}.$$

From Eqn. (1), the signal received at the l-th base station is $$Y_l = \sqrt{p_{MS}\tau} \sum_{j=1}^{L} \Psi_j D_{jl}^{1/2} H_{jl} + W_l$$

($Y_l$ is a $\tau \times M$ matrix)

It will be understood that $Y_l$ is a matrix, each of whose columns corresponds to one of the M antennas at the l-th base station. Each column of $Y_l$ is a τ-tuple of scalar values. Each of the scalar values corresponds to one of the τ symbols of the transmitted pilot signal, and represents a sum, at the m-th antenna, of the various versions of the symbol as received from the respective mobiles occupying the served cell and neighboring cells, plus additive noise.

When the pilot signals $\psi_{jk}$ are designed to be mutually orthogonal (as is typically the case), their orthogonality properties can be used in an appropriately designed receiver to recover estimates of the individual channel coefficients) $h_{jlk} = (h_{jlk1}, \ldots, h_{jlkM})$ at the l-th base station. Even if there are small deviations from complete orthogonality, it may be possible to employ the same techniques to obtain estimates of the channel coefficients. Accordingly, it should be understood that when we speak herein of "orthogonal" pilot signals, we mean to include pilot signals that may deviate somewhat from complete orthogonality, but not so much as to render ineffective the estimation of individual channel coefficients.

Thus, for example, an MMSE estimator uses prior knowledge of the pilot signals and the orthogonality property that $\Psi_i^* \Psi_j = \delta_{ij} I_K$ to recover an estimate $\hat{H}_{jl}$ of the matrix $H_{jl}$ defined above. $I_K$ is the K×K unity matrix.

That is, the MMSE estimator of $H_{jl}$ given $Y_l$ is $$\hat{H}_{jl} = \begin{bmatrix} \hat{h}_{jl1} \\ \vdots \\ \hat{h}_{jlK} \end{bmatrix}$$

$$= \sqrt{p_{MS}\tau}\, D_{jl}^{1/2} \Psi_j^* \left( I + p_{MS}\tau \sum_{i=1}^{L} \Psi_i D_{il}^{1/2} \Psi_i^* \right)^{-1} Y_l.$$

Data Transmission from Base Stations to Mobiles.

Using the estimates $\hat{H}_{jl}$, j=1, ..., L, the l-th base station can use either linear or nonlinear precoding to provide mobiles from the l-th cell with strong signals and to limit intra-cell interference and inter-cell interference to mobiles from its own cell and to mobiles from other cells. In particular, a linear precoding can be done as follows.

Let $q_{l1}, \ldots, q_{lK}$ be signals that should be transmitted by the l-th base station to the corresponding mobiles from the l-th cell. Using the estimates $\hat{H}_{jl}$, j=1, ..., L, the l-th base station forms an M×K precoding matrix $A_l$ and transmits signals $$s_l = \begin{pmatrix} s_{l1} \\ \vdots \\ s_{lK} \end{pmatrix} = A_l \begin{pmatrix} q_{l1} \\ \vdots \\ q_{lK} \end{pmatrix}. \quad (2)$$

The signal received by the k-th mobile from the j-th cell is $$x_{jk} = \sum_{l=1}^{L} \sqrt{p_{BS} \beta_{jlk}}\, h_{jlk} s_l + z \quad (3)$$

There are many different efficient precoding matrices, that allow one to significantly reduce the intra-cell interference and the inter-cell interference. One possible way is to use as $A_l$ the pseudoinverse of $\hat{H}_{ll}$.

Pilot Signals and their Assignment to Mobiles.

As mentioned above, precoding may be employed to significantly reduce the interference. However, as a general rule, the precoding works well only if the estimates $\hat{h}_{jlk}$, j=1, ..., L, k=1, ..., K, are accurate and uncorrelated. In order to obtain fully accurate and uncorrelated estimates, the pilot signals (also referred to below as "pilots") $\psi_{jk}$, j=1, ..., L, k=1, ..., K, must be orthogonal. Unfortunately it is not generally possible, as a practical matter, to satisfy this requirement simultaneously over all mobiles in a given cell and its neighboring cells.

That is, mobiles may move with high speeds, e.g. vehicular speeds, and may consequently have short coherence intervals, i.e., low values of T. The channel coefficients, which the base station learns with the help of the pilots, remain effectively constant only during a given coherence interval. As a consequence, the maximum interval available to the base station for transmitting data to the mobiles is T−τ. Therefore, it is advantageous to make τ, the length of the pilot signals measured in symbol intervals, as small as possible.

Typically, τ can take values from 4 to 12, depending on the speed of the mobiles in a particular wireless network. Elementary vector analysis teaches that a set of mutually orthogonal τ-dimensional vectors cannot contain more than τ elements; otherwise, at least one pair of vectors will be non-orthogonal. Consequently, the maximum number of mobiles that can have orthogonal pilot signals at a given time is equal to τ.

The number L of cells in a group consisting of a given cell and the cells neighboring the given cell in a typical hexagonal network is 7 as shown, e.g. in FIG. 1, and it will be taken as 7 in our illustrative example. For example, as will be seen in FIG. 1, a cell 1 may be surrounded by neighbor cells 2-7. Thus it will be clear that if two or more mobiles are simultaneously served by their respective base stations in a given cell and each of its six neighbors, the pilots being used cannot all be mutually orthogonal, even if τ is as high as 12.

As a general rule, mitigation of intra-cell interference is more important than mitigation of inter-cell interference. Intra-cell interference can be efficiently mitigated by requiring that all the pilots used within a given cell be orthogonal. Accordingly, it will be assumed in the example discussed below that pilot signals used for the mobiles within a given cell are orthogonal.

If pilot signals belonging to a pair of mobiles from different cells, say $\psi_{jk}$ and $\psi_{ls}$, are not orthogonal, then the estimates of the channel vectors $h_{jlk}$ and $h_{lls}$ will be inaccurate, and in particular, they will be at least partially correlated. This will result in a bad precoding matrix $A_l$. That is, using such estimates, the l-th base station will generate a precoding matrix $A_l$ whose entries are at least partially adapted to aid the transmission of data from the l-th base station to the k-th mobile of the j-th cell. In other words, the signal $s_l$ generated according to Eqn. (2) will arrive at the k-th mobile of the j-th cell with relatively high strength. Stated differently, the product $|h_{jlk} s_l|$ will be large. Thus the l-th base station will create strong interference at this mobile. Referring again to FIG. 1, it will be seen that the signals shown arriving at two mobile stations of cell 2 cause interference of the kind described here.

If, meanwhile, the shadow coefficient $\beta_{jlk}$ (between the k-th mobile of the j-th cell and the l-th base station) is small, then, according to Eqn. (1), the pilot signal $\psi_{jk}$ will arrive at the l-th base station with low strength and might not make a significant contribution to the matrix $A_l$.

We will now discuss an example construction of pilot signals of length τ=9. As noted above, various lengths are possible, both less than and greater than 9. However, our construction is likely to find the greatest use when the length of the pilot signals is in the range 9 to 12, or even somewhat more.

Figure 2:
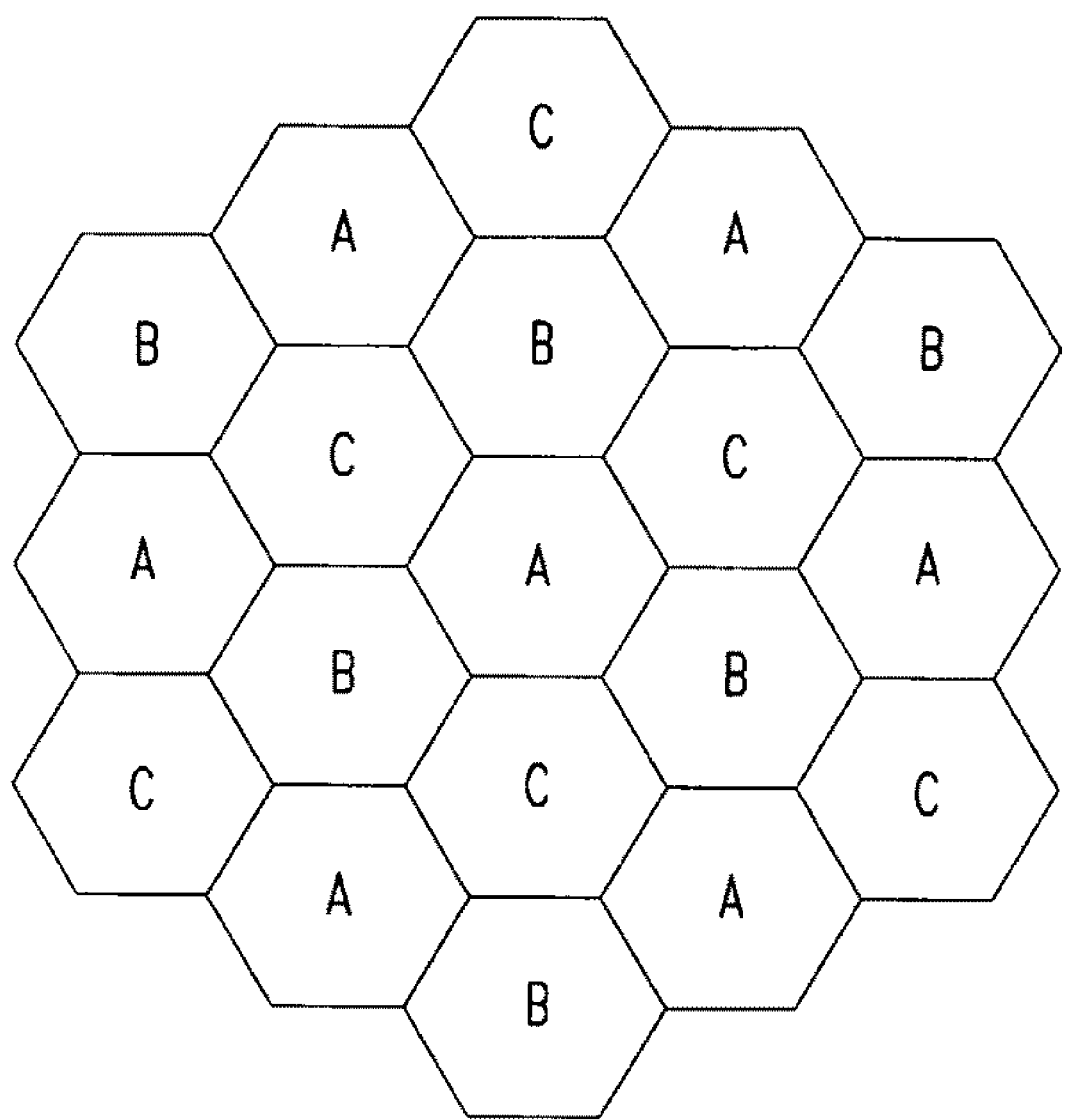
FIG. 2 is a schematic drawing of a portion of a cellular network having a reuse pattern of reuse factor 3 for uplink pilot signals. The three reuse classes are A, B, and C.

Conventionally, each cell uses the same set of τ=9 orthogonal pilot signals, say $a_1, \ldots, a_9$. In other words, the reuse factor for pilot signals is 1. In our construction, by contrast, there is a reuse factor of 3 for pilot signals. That is, with reference to FIG. 2, orthogonal pilot signals (each of which is a 9-tuple, as will be understood from the preceding discussion) $u_1, \ldots, u_9$, are used in the cells designated in the figure as belonging to reuse class A (hereinafter, "A-cells"), orthogonal pilot signals $v_1, \ldots, v_9$, are used in the cells designated in the figure as belonging to reuse class B (hereinafter, "B-cells"), and orthogonal pilot signals $w_1, \ldots, w_9$, are used in the cells designated in the figure as belonging to reuse class C (hereinafter "C-cells"). It will be seen that in the reuse pattern of FIG. 2, each A-cell is neighbored by three B-cells and three C-cells, and that a similar neighborhood obtains, mutatis mutandis, for each B-cell and for each C-cell.

In accordance with the orthogonality property defined above and our requirement that all pilot signals belonging to mobiles within a given cell must be mutually orthogonal, we therefore have $v_i^* v_j = \delta_{ij}$, $u_i^* u_j = \delta_{ij}$, $w_i^* w_j = \delta_{ij}$. As noted above, however, it is impracticable to design pilots such that $v_i^* u_j = 0$, $v_i^* w_j = 0$, $u_i^* w_j = 0$ for all indexes i and j.

Although based on an idealizing assumption, it is often useful to model mobiles as uniformly distributed over the space of a cell. Accordingly, we will assume that at any given time, several mobiles will be located within a small distance from the center of a cell. (Practical experience confirms that this is a typical situation.) We will refer to such mobiles as centre-mobiles. By contrast, mobiles located close to the edges of a cell will be referred to as peripheral mobiles.

Although it is intuitively appealing to think in terms of geographical distance, it will more often be the case that how "far" a given mobile is from its serving base station and the neighboring base stations will be measured by its shadow coefficients relative to the respective base stations. Knowledge of these shadow coefficients is typically shared among the various base stations of the network, so that each base station can readily determine which are its centre-mobiles and which are its peripheral mobiles. A different measure of distance from the center of a cell may usefully be provided in some cases by, e.g., a GPS receiver at the mobile station.

Our construction is based on the assumption that during one communication session, a base station will simultaneously serve three centre-mobiles and six peripheral mobiles.

Centre-mobiles typically do not suffer significantly from inter-cell interference. The reason for this is that their pilots, say $v_7, v_8, v_9$, arrive at their base station in a condition of high signal strength, and therefore remain substantially uncorrupted by interfering pilots from other mobiles. Therefore, it is sufficient (for avoidance of interference) if the pilots $v_7, v_8, v_9$ are orthogonal to each other and to other pilots from the same cell. Accordingly, in our construction we assign a respective group of three pilots, e.g., $u_7, \ldots, u_9$ $v_7, \ldots, v_9$ and $w_7, \ldots, w_9$ to the centre-mobiles of each class of cells.

The orthogonality properties of the pilots $u_7, \ldots, u_9$, $v_7, \ldots, v_9$, and $w_7, \ldots, w_9$ having been determined, there remain to be discussed six pilots for each class of cells. That is, there remain $u_1, \ldots, u_6, v_1, \ldots, v_6$ and $w_1, \ldots, w_6$ for the A-cells, B-cells, and C-cells, respectively.

According to our construction, we design pilots $u_1, \ldots, u_6$, $v_1, \ldots, v_6$, and $w_1, \ldots, w_6$ such that
the pilots $v_2, v_4, v_6$ are orthogonal to the pilots $u_1, \ldots, u_6$,
the pilots $v_1, v_3, v_5$ are orthogonal to the pilots $w_1, \ldots, w_6$,
the pilots $u_2, u_4, u_6$ are orthogonal to the pilots $w_1, \ldots, w_6$,
the pilots $u_1, u_3, u_5$ are orthogonal to the pilots, $v_1, \ldots, v_6$,
the pilots $w_2, w_4, w_6$ are orthogonal to the pilots $v_1, \ldots, v_6$, and
the pilots $w_1, w_3, w_5$ are orthogonal to the pilots $u_1, \ldots, u_6$.
The following set of pilots, in which w is defined by $w = e^{i2\pi/3}$ is one example that satisfies the above requirements:
$v_1 = (1,1,1,1,1,1,1,1,1)$;
$v_2 = (1,1,1,w,w,w,w^2,w^2,w^2)$;
$v_3 = (1,w,w^2,1,w,w^2,1,w,w^2)$;
$v_4 = (1,w,w^2,w,w^2,1,w^2,1,w)$;
$v_5 = (1,w^2,w,1,w^2,w,1,w^2,w)$;
$v_6 = (1,w^2,w,w,1,w^2,w^2,w,1)$;
$v_7 = (1,w,w^2,w^2,1,w,w,w^2,1)$;
$v_8 = (1,1,1,w^2,w^2,w^2,w,w,w)$;
$v_9 = (1,w^2,w,w^2,w,1,w,1,w^2)$;
$u_1 = (1,1,1,w^2,w^2,w^2,w,w,w)$;
$u_2 = (1,w^2,1,1,w^2,1,1,w^2,1)$;
$u_3 = (1,w,w^2,w^2,1,w,w,w^2,1)$;
$u_4 = (1,1,w^2,1,1,w^2,1,1,w^2)$;
$u_5 = (1,w^2,w,w^2,w,1,w,1,w^2)$;
$u_6 = (1,w,w,1,w,w,1,w,w)$;
$u_7 = (1,1,w^2,w,w,1,w^2,w^2,w)$;
$u_8 = (1,w^2,1,w,1,w,w^2,w,w^2)$;
$u_9 = (1,w,w,w,w^2,w^2,w^2,1,1)$;
$w_1 = (1,w^2,1,w,1,w,w^2,w,w^2)$;
$w_2 = (1,w^2,1,w^2,w,w^2,w,1,w)$;
$w_3 = (1,1,w^2,w,w,1,w^2,w^2,w)$;
$w_4 = (1,1,w^2,w^2,w^2,w,w,w,1)$;
$w_5 = (1,w,w,w,w^2,w^2,w^2,1,1)$;
$w_6 = (1,w,w,w^2,1,1,w,w^2,w^2)$;
$w_7 = (1,w,w^2,1,w,w^2,1,w,w^2)$;
$w_8 = (1,1,1,1,1,1,1,1,1)$;
$w_9 = (1,w^2,w,1,w^2,w,1,w^2,w)$;
It will be seen that for each of the sets $U = \{u_i\}$, $V = \{v_i\}$, $W = \{w_i\}$ of pilot signals defined above, each one of the nine components of each vector has the form $e^{2n\pi i/3}$, wherein $n = 0$, 1, or 2. Those skilled in the art will understand that an equivalent set of pilot signals is derivable from each of U, V, and W as defined above, by applying a common scale factor, phase shift, or unitary rotation.

We will now describe two exemplary methods for allocating pilots to the mobiles from the cells of respective classes A, B, and C.

Method 1. Consider, e.g., an A-cell. To mobiles located near an edge between the A-cell and a B-cell (as noted, there are three B-cells neighboring any A-cell) assign pilots that are orthogonal to pilots used in B-cells (pilots $v_1, \ldots, v_6$). Similarly, to mobiles located near an edge between the A-cell and a C-cell (as noted, there are three C-cells neighboring any A-cell) assign pilots that are orthogonal to pilots used in C-cells (pilots $w_1, \ldots, w_6$).

Figure 3:
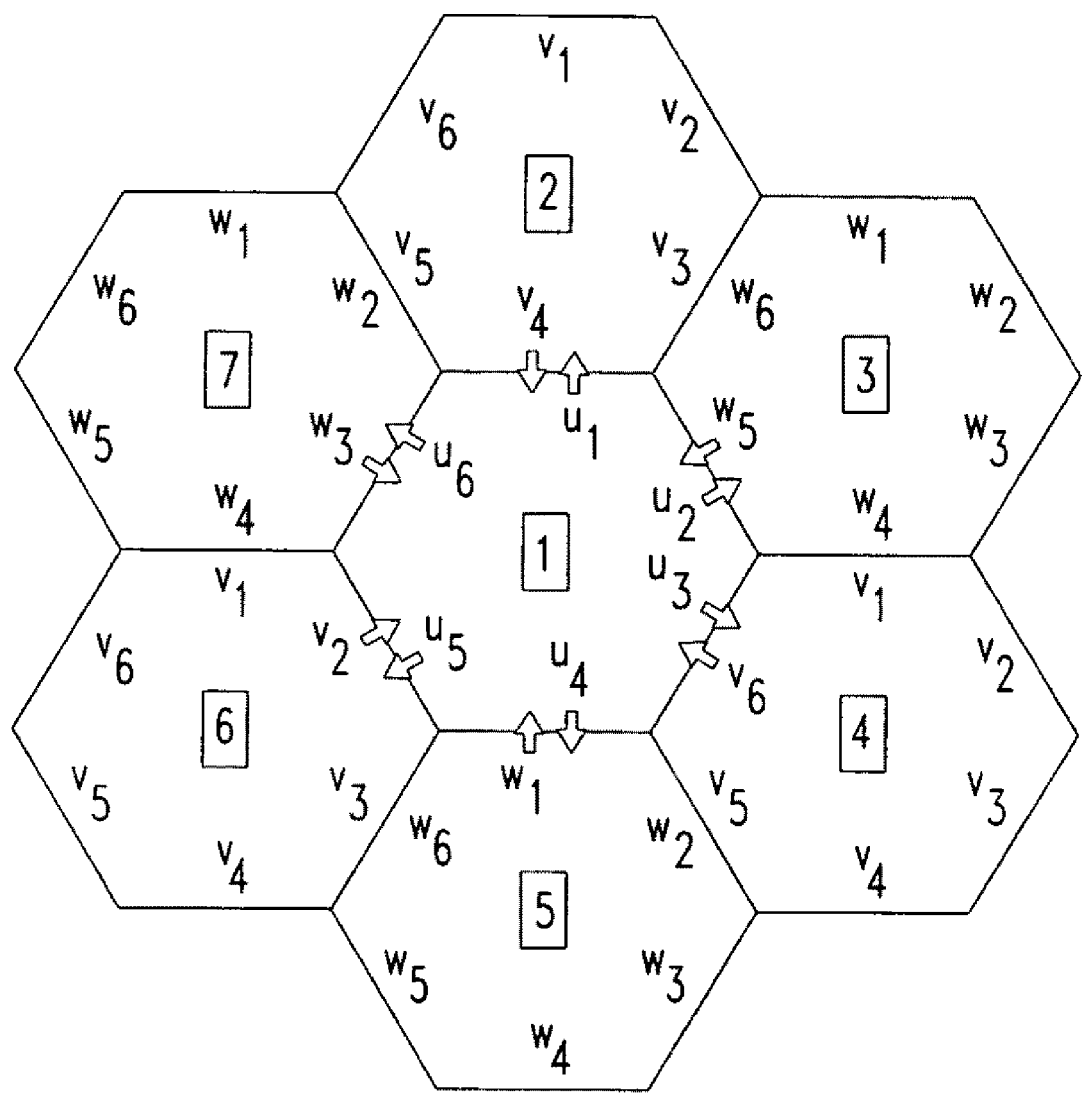
FIG. 3 is a schematic drawing of a portion of a cellular network having a reuse pattern similar to that of FIG. 2.

Such an assignment is shown in FIG. 3, where it will be seen that the "odd" pilots $u_1, u_3$, and $u_5$ are assigned to peripheral mobiles near class B cells, the "even" pilots $u_2, u_4$, and $u_6$ are assigned to peripheral mobiles near class C cells, and the six pilots assigned to peripheral mobiles of cell 1 are orthogonal to class B pilots $v_2, v_4$, and $v_6$ (in cells 2, 4, and 6) and to class C pilots $w_1, w_3$, and $w_5$ (in cells 3, 5, and 7).

The rationale for Method 1 is that if the distance between a mobile and a base station is small, then the corresponding shadowing coefficient will typically be large. For example, with further reference to FIG. 3, among the mobiles in cell 1 the mobile with pilot $u_1$ will typically have the largest shadowing coefficient relative to base station 2. Hence the mobile with pilot $u_1$ will corrupt pilots from cell 2 more than other mobiles from cell 1. Hence by making $u_1$ orthogonal to pilots $v_1, \ldots, v_6$, we minimize the damage to pilots from cell 2 produced by pilots from cell 1.

Figure 5:
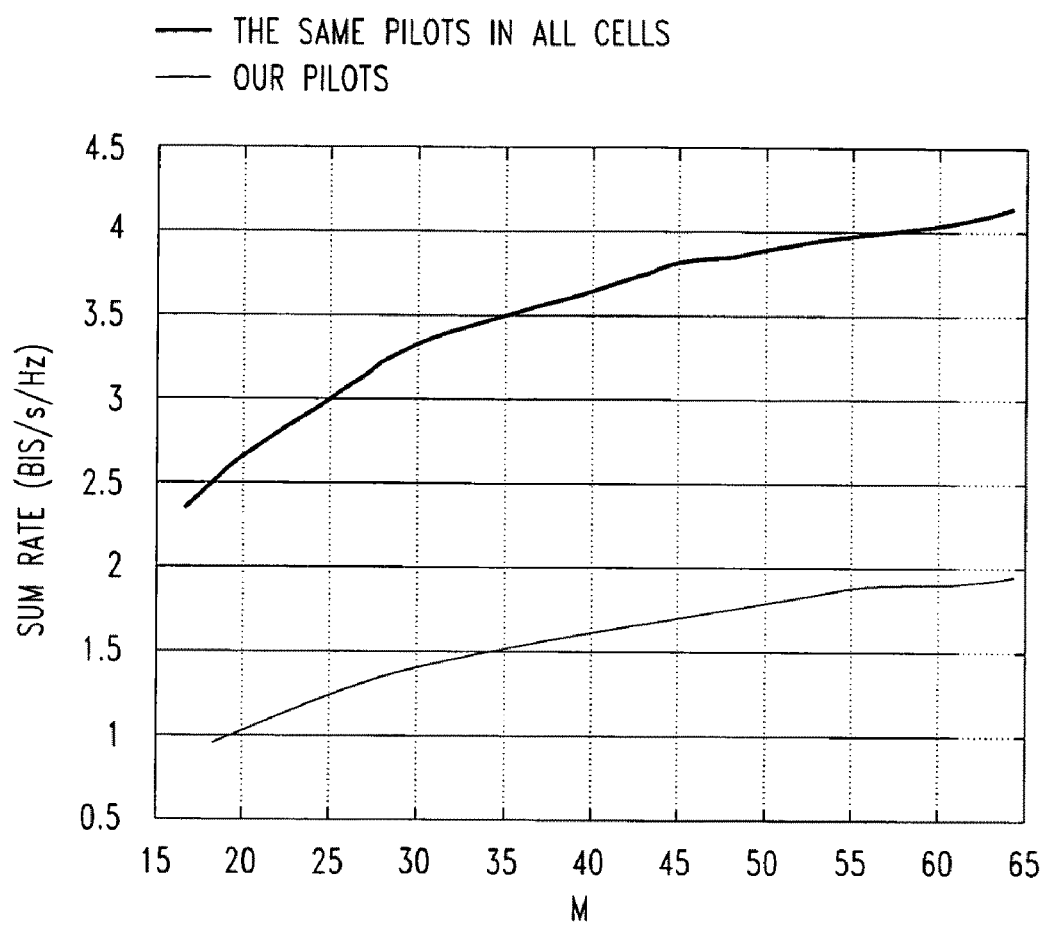
FIG. 5 is a plot of total throughput versus the number of base station antennas, obtained from numerical simulations applying the principles described below.

In FIG. 5, we present simulation results for two cells with pilots assigned as shown in FIG. 4, and we compare the total throughput (in bits per second per Hz) that is obtained with the total throughput obtained in the contrasting case where the same set of orthogonal pilots, e.g. $v_1, \ldots, v_9$, is used in both cells. Two plots are shown, the upper curve representing our new construction, and the lower curve representing the conventional case. It will be evident that our new construction gives a significant improvement.

More specifically, it will be seen that for M=20 base station antennas, the new construction results in almost double the throughput, and that the improvement continues to increase as the number of antennas is increased at least to 30, with more modest improvements thereafter.

Method 2. Without loss of generality let j=1. (Recall that j identifies a particular cell in which a mobile is present, l identifies a particular base station and by extension, the cell served by that particular base station, and that k identifies a particular mobile within a given cell.)

First, for all the mobile stations in cell j=1, order the respective shadow coefficients (between each mobile k and each neighboring base station l) in decreasing order of size. That is, for the shadow coefficients $\beta_{1lk}$, $l=2, \ldots, 6$; $k=1, \ldots, 6$, find indices $l_i$ and $k_i$ such that $\beta_{1l_1k_1} \geq \beta_{1l_2k_2} \geq \beta_{1l_3k_3} \geq \ldots$.

Then, assign to the $k_1$-th mobile of cell j=1 a pilot that is orthogonal to all pilots used in the $l_1$-th cell. For example if $k_1 = 3$ and $l_1 = 4$ then assign to the third mobile of the first cell a pilot that is orthogonal to all pilots used in cell 4, that is to pilots $v_1, \ldots, v_6$.

Then, assign to the $k_2$-th mobile of cell j=1 a pilot (that has not been used yet) orthogonal to all pilots used in cell $l_2$. And so on similarly for $l_i$ and $k_i$. If for some $l_i$ and $k_i$ there is no available pilot that would be orthogonal to pilots used in cell $l_i$, then skip these $l_i$ and $k_i$ and go to $l_{i+1}$ and $k_{i+1}$.

General pilot signal size $\tau$. In the case of a general value for $\tau$, our construction again calls for using in A-cell orthogonal mobiles the pilot signals $u_1, \ldots, u_\tau$, in B-cell orthogonal mobiles the pilot signals $v_1, \ldots, v_\tau$, and in C-cell orthogonal mobiles the pilot signals $w_1, \ldots, w_\tau$. We assume that a base station will serve m centre-mobiles and $\tau$–m peripheral mobiles. In such a construction, we use, e.g., the pilots $v_{\tau-m+1}, \ldots, v_\tau, u_{\tau-m+1}, \ldots, u_\tau$, and $w_{\tau-m+1}, \ldots, w_\tau$, for centre-mobiles.

Advantageously, the pilots $v_1, \ldots v_{\tau-m}, u_1, \ldots, u_{\tau-m}$, and $w, w_1, \ldots, w_{\tau-m}$ are constructed such that as many as possible of the pilots $v_{j_1}, \ldots, v_{j_r}$, are orthogonal to the pilots $u_1, \ldots, u_{\tau-m}$, and as many as possible of the pilots $v_{i_1}, \ldots, v_{i_s}$ are orthogonal to pilots $w_1, \ldots, w_{\tau-m}$, We require the same property, mutatis mutandis, for pilots $u_1, \ldots, u_{\tau-m}$, and $w_1, \ldots, w_{\tau-m}$.

The various operations of information processing and retrieval described above may be carried out by general purpose or special purpose digital processors under the control of appropriate programs implemented in software, hardware, or firmware.

A typical base station may include a digital memory for storing information about at least the set of pilot signals assigned to its reuse class. Said information may include an explicit enumeration of the pilot signals or of equivalent information, or it may include instead a set of parameters from which the needed information can be algorithmically generated.

Similarly, each mobile station may include a digital memory for storing information about the set of pilot signals assigned to its cell, and more typically about all three sets of pilot signals. Such information may be either an explicit enumeration or a set of parameters from which such enumeration may be generated.

Accordingly, in at least some implementations, base station apparatus will advantageously include circuitry configured to provide knowledge of the pilot signals as described above, a processor configured to derive information about the propagation channel using the knowledge of pilot signals, and a processor configured to precode a signal for transmission to a selected mobile station, using information about the propagation channel as explained above.

In at least some implementations, the base station will also advantageously include a processor configured to classify each mobile station currently within a cell served by a base station as a center mobile, a peripheral mobile near neighbor cell of one of the neighboring classes, or a peripheral mobile near a neighbor cell of the other of the neighboring classes. The base station will also advantageously include a processor configured to allocate pilot signals to the mobile stations according to how they are classified.

Similarly, in at least some implementations, mobile station apparatus will advantageously include a receiver for receiving a signal from a base station designating a pilot signal to be selected for transmission, a storage element for storing information about the pilot signals as described above, a processor for providing the designated pilot signal to a transmitter using the stored information, and a transmitter for transmitting the designated pilot signal.

What is claimed is:

1. A method for characterizing state information of the propagation channel in a cell having edges adjacent to other cells of a cellular network in which at least three non-overlapping sets U, V, W of pilot signals are defined, comprising:

receiving a pilot signal, belonging to the set U, transmitted over a wireless radiofrequency propagation channel from at least one mobile station belonging to the cellular network; and in a processor, deriving information about the propagation channel from the transmitted and received pilot signal using knowledge of the pilot signals in the set U, wherein:

in a representation of the pilot signals as vectors, each of the sets U, V, and W consists of mutually orthogonal elements;

each of U, V, and W includes at least six peripheral elements and at least three central elements;

the six peripheral elements of each set U, V, W are orthogonal to at least three peripheral elements of each of the other two sets; and the received pilot signal is a peripheral element of U if the transmitting mobile station is near an edge of the cell, but is a central element of U if the transmitting mobile station is not near an edge of the cell.

2. The method of claim 1, further comprising, in a processor, precoding a signal and transmitting the signal for reception by a selected mobile station, wherein the precoding step uses at least some of the information about the propagation channel derived from the transmitted and received pilot signal.

3. The method of claim 1, wherein:

each of the sets U, V, and W consists of nine mutually orthogonal signal vectors, and each said vector has nine components; and each of the sets U, V, and W is either: a set, of vectors, having the property that all vector components are of the form $e^{2n\pi i/3}$, wherein n=0, 1, or 2; or a set, of vectors, derivable from a set having said property by applying a common scale factor, phase shift, or unitary rotation to all vectors in the set having said property.

4. A method to be carried out by a base station in a cellular network having a reuse factor of 3 for uplink pilot signals to be used for channel measurement, said base station belonging to a cell in a reuse class A that is one of three reuse classes A, B, and C, wherein said cell may have one or more edges adjacent to cells of class B and simultaneously one or more edges adjacent to cells of class C, the method comprising:

classifying each mobile station currently within the cell served by the base station as a center mobile, a peripheral mobile near a class B cell, or a peripheral mobile near a class C cell;

allocating a set of mutually orthogonal pilot signals to the mobile stations such that each peripheral mobile station adjacent to a class B cell is allocated a pilot signal that is also orthogonal to some class B pilot signals, and each peripheral mobile station adjacent to a class C cell is allocated a pilot signal that is also orthogonal to some class C pilot signals; and transmitting, to each said mobile station within the served cell, a signal designating at least one pilot signal that has been allocated to that mobile station.

5. The method of claim 4, wherein:

three sets $U=\{u_i\}$, $V=\{v_i\}$, $W=\{w_i\}$ of pilot signals are defined;

one of said sets is allocated to each respective class of cells;

the pilot signals in each of the sets U, V, W viewed as vectors constitute an orthogonal basis;

at least three of the elements $u_i$ of U form an orthogonal basis with at least six of the elements $v_i$ of V;

at least three other of the elements $u_i$ of U form an orthogonal basis with at least six of the elements $w_i$ of W;

said at least six elements $u_i$ of U form an orthogonal basis with at least three of the elements $v_i$ of V and form another orthogonal basis with at least three of the elements $w_i$ of W;

at least three of the elements of V form an orthogonal basis with at least six of the elements of W; and at least three of the elements of W form an orthogonal basis with at least six of the elements of V.

6. A method to be carried out by a mobile station belonging to a cellular network in which at least three: non-overlapping sets U, V, W of pilot signals are defined, comprising:

receiving a signal from a base station designating a pilot signal of a set U, which is one of said three sets U, V, W, to be selected for transmission;

selecting the designated pilot signal; and transmitting the designated pilot signal to the base station for the base station to derive, using a processor, information therefrom that characterizes the propagation channel between the mobile station and the base station using knowledge of the pilot signals in the set U; wherein:

in a representation of the pilot signals as vectors, each of the sets U, V, and W consists of mutually orthogonal elements;

each of U, V, and W includes at least six peripheral elements and at least three central elements;

the six peripheral elements of each set U, V, W are orthogonal to at least three peripheral elements of each of the other two sets; and the transmitted pilot signal is a peripheral element of U if the transmitting mobile station is near an edge of the cell, but is a central element of U if the transmitting mobile station is not near an edge of the cell.

7. The method of claim 6, wherein:

each of the sets U, V, and W consists of nine mutually orthogonal signal vectors, and each said vector has nine components; and each of the sets U, V, and W is either: a set, of vectors, having the property that all vector components are of the form $e^{2n\pi i/3}$, wherein n=0, 1, or 2; or a set, of vectors, derivable from a set having said property by applying a common scale factor, phase shift, or unitary rotation to all vectors in the set having said property.

8. The method of claim 6, wherein:

at least three of the elements of V form an orthogonal basis with at least six of the elements of W; and at least three of the elements of W form an orthogonal basis with at least six of the elements of V.

9. Base station apparatus configured for characterizing state information of the propagation channel in a cell having edges adjacent to other cells of a cellular network in which at least three non-overlapping sets U, V, W of pilot signals are defined, comprising:

a circuit configured to receive a pilot signal belonging to a set U that is one of the three sets U, V, W of pilot signals, said pilot signal being transmitted over a wireless radiofrequency propagation channel from at least one mobile station belonging to the cellular network; and a processor configured to derive information about the propagation channel from the received pilot signal using stored knowledge of the pilot signals in the set U, wherein:

in a representation of the pilot signals as vectors, each of the sets U, V, and W consists of mutually orthogonal elements;

each of U, V, and W includes at least six peripheral elements and at least three central elements;

the six peripheral elements of each set U, V, W are orthogonal to at least three peripheral elements of each of the other two sets; and the received pilot signal is a peripheral element of U if the transmitting mobile station is near an edge of the cell, but is a central element of U if the transmitting mobile station is not near an edge of the cell.

10. The base station apparatus of claim 9, further comprising a processor configured to precode a signal for transmission to a selected mobile station, wherein the precoding uses at least some of said information about the propagation channel.

11. Base station apparatus for a cellular network having a reuse factor of 3 for uplink pilot signals to be used for channel measurement such that each cell of respective reuse class A, B, or C may simultaneously have one or more edges adjacent to cells of the other two classes, said base station apparatus configured for a base station belonging to a reuse class A, and comprising:

a processor configured to classify each mobile station currently within a cell served by the base station as a center mobile, a peripheral mobile near a class B cell, or a peripheral mobile near a class C cell; and a processor configured to allocate a set of mutually orthogonal pilot signals to the mobile stations such that each peripheral mobile station adjacent to a class B cell is allocated a pilot signal that is also orthogonal to some class B pilot signals, and each peripheral mobile station adjacent to a class C cell is allocated a pilot signal that is also orthogonal to some class C pilot signals; and a transmitter, configured to transmit, to each said mobile station within the served cell, a signal designating at least one pilot signal that has been allocated to that mobile station.

12. A mobile station belonging to a cellular network in which at least three non-overlapping sets U, V, W of pilot signals are defined, comprising:

a receiver for receiving a signal from a base station designating a pilot signal of a set U, which is one of said three sets U, V, W, to be selected for transmission;

a storage element for storing information about the pilot signals constituting sets U, V, and W;

a processor for providing the designated pilot signal to a transmitter using the stored information; and a transmitter for transmitting the designated pilot signal to the base station for the base station to derive, using a processor, information therefrom that characterizes the propagation channel between the mobile station and the base station using knowledge of the pilot signals in the set U; wherein:

in a representation of the pilot signals as vectors, each of the sets U, V, and W consists of mutually orthogonal elements;

each of U, V, and W includes at least six peripheral elements and at least three central elements;

the six peripheral elements of each set U, V, W are orthogonal to at least three peripheral elements of each of the other two sets; and the transmitted pilot signal is a peripheral element of U if the transmitting mobile station is near an edge of the cell, but is a central element of U if the transmitting mobile station is not near an edge of the cell.

13. The mobile station of claim 12, wherein:

each of the sets U, V, and W consists of nine mutually orthogonal signal vectors, and each said vector has nine components; and each of the sets U, V, and W is either: a set, of vectors, having the property that all vector components are of the form $e^{2n\pi i/3}$, wherein n=0, 1, or 2; or a set, of vectors, derivable from a set having said property by applying a common scale factor, phase shift, or unitary rotation to all vectors in the set having said property.

14. The mobile station of claim 12, wherein:

at least three of the elements of V form an orthogonal basis with at least six of the elements of W; and at least three of the elements of W form an orthogonal basis with at least six of the elements of V.

* * * * *